United States Patent
Hayes et al.

(10) Patent No.: US 11,058,091 B2
(45) Date of Patent: Jul. 13, 2021

(54) LOW DUST ANIMAL LITTER

(71) Applicant: Rohm and Haas Company, Collegeville, PA (US)

(72) Inventors: John Hayes, Collegeville, PA (US); Theodore Tysak, Ambler, PA (US)

(73) Assignee: Rohm and Haas Company, Philadelphia, PA (US)

(*) Notice: Subject to any disclaimer, the term of this patent is extended or adjusted under 35 U.S.C. 154(b) by 205 days.

(21) Appl. No.: 15/769,963

(22) PCT Filed: Jan. 23, 2017

(86) PCT No.: PCT/US2017/014517
§ 371 (c)(1),
(2) Date: Apr. 20, 2018

(87) PCT Pub. No.: WO2017/142681
PCT Pub. Date: Aug. 24, 2017

(65) Prior Publication Data
US 2018/0343824 A1 Dec. 6, 2018

Related U.S. Application Data

(60) Provisional application No. 62/297,399, filed on Feb. 19, 2016.

(51) Int. Cl.
*A01K 1/015* (2006.01)
*B01J 20/12* (2006.01)
*B01J 20/26* (2006.01)
*B01J 20/32* (2006.01)

(52) U.S. Cl.
CPC .......... *A01K 1/0154* (2013.01); *A01K 1/0152* (2013.01); *B01J 20/12* (2013.01); *B01J 20/262* (2013.01); *B01J 20/3204* (2013.01); *B01J 20/3272* (2013.01)

(58) Field of Classification Search
None
See application file for complete search history.

(56) References Cited

U.S. PATENT DOCUMENTS

| 4,166,039 | A | * | 8/1979 | Wise | C11D 1/72 510/452 |
| 2005/0075258 | A1 | * | 4/2005 | Kessler | C11D 7/265 510/221 |
| 2006/0201438 | A1 | | 9/2006 | Anttila et al. | |
| 2007/0142265 | A1 | * | 6/2007 | Oki | C11D 3/3945 510/515 |
| 2010/0040569 | A1 | * | 2/2010 | Dykstra | A61Q 19/10 424/70.1 |
| 2010/0280162 | A1 | | 11/2010 | Stesikova et al. | |
| 2011/0165101 | A1 | * | 7/2011 | Dykstra | A61Q 13/00 424/70.1 |
| 2013/0305997 | A1 | | 11/2013 | Miller et al. | |
| 2016/0130489 | A1 | * | 5/2016 | Gilmour | E01C 21/00 435/252.5 |
| 2016/0251570 | A1 | | 9/2016 | Hook et al. | |

FOREIGN PATENT DOCUMENTS

WO 2011134074 11/2011

* cited by examiner

Primary Examiner — Joseph D Anthony
(74) Attorney, Agent, or Firm — Raef M. Shaltout

(57) ABSTRACT

Provided is a carrier material and its use in animal litter, where the carrier material exhibits reduced dust formation during handling. The carrier material comprises: bentonite clay; and a dust suppression agent coated on the bentonite clay, wherein the dust suppression agent is one or more alkoxylate materials of formula (I): R—O-(AO)$_z$—H, wherein R is H, aryl (e.g., phenyl), or linear or branched $C_4$-$C_{24}$ alkyl; AO at each occurrence is independently ethyleneoxy, propyleneoxy, butyleneoxy, or random or block mixtures thereof; and z represents average number of moles of AO and ranges from 1 to 80.

8 Claims, No Drawings

LOW DUST ANIMAL LITTER

FIELD

This invention relates generally to animal litter for absorbing animal waste, and more particularly to animal litter that exhibits reduced dust formation during handling.

BACKGROUND

Animal litter compositions, such as cat litter, are widely used for collecting urine and feces of housebroken or farm animals. Bentonite clays are a commonly used carrier absorbent material in animal litter. Bentonite clays have various advantages over other carrier materials. For instance, sodium bentonite agglomerates when wet to form a mass. As a result, soiled litter can be readily separated from unsoiled litter. Non-swelling bentonite clays, such as calcium bentonite, may agglomerate or gel by the addition of additives.

Although bentonite clays are desirable carrier materials, they have the disadvantage of generating large amounts of dust upon handling because of their small particle size. This dust generation problem is known and various solutions have been previously proposed. One approach uses salt solutions ($CaCl_2$ and $MgCl_2$) with certain odor abatement materials in an effort to mitigate the dusting phenomena. Another approach employs mineral oil to partially coat animal litter particulates to reduce dust formation.

However, these approaches have various drawbacks, including the potential to negatively impact the end-use performance requirements of the cat litter, such as flow of the litter and clumping in litter boxes. For instance, $CaCl_2$ and $MgCl_2$ are hydroscopic salts that can draw moisture from the ambient air and, with time, add dampness to the carrier material. This can prematurely start the agglomeration process and thus reduce the absorbent effectiveness of the bentonite. The hydrophobic nature of mineral oil may bind particles, thus causing less surface area of the litter and consequently reducing the effectiveness of the bentonite to collect and absorb urine and feces.

It continues to be desirable, therefore, to develop new and improved solutions to the animal litter dusting problem.

STATEMENT OF INVENTION

We have now found that dust formed when handling animal litter containing bentonite clay may be significantly reduced by coating the bentonite clay with a dust suppression agent having a chemical composition as described here.

Accordingly, in one aspect of the invention, there is provided a carrier material for use in animal litter. The carrier material comprises: bentonite clay; and a dust suppression agent coated on the bentonite clay, wherein the dust suppression agent is one or more alkoxylate materials of formula I:

$$R\text{—}O\text{-}(AO)_z\text{—}H \qquad (I)$$

wherein R is H, aryl (e.g., phenyl), or linear or branched $C_4$-$C_{24}$ alkyl; AO at each occurrence is independently ethyleneoxy, propyleneoxy, butyleneoxy, or random or block mixtures thereof; and z represents the average number of moles of AO and ranges from 1 to 80.

In another aspect, there is provided a method for reducing dust formation in animal litter containing bentonite clay as a carrier material. The method comprises: coating the bentonite clay with a dust suppression agent as described herein.

DETAILED DESCRIPTION

Unless otherwise indicated, numeric ranges, for instance as in "from 2 to 10," are inclusive of the numbers defining the range (e.g., 2 and 10). Unless otherwise indicated, ratios, percentages, parts, and the like are by weight. As used herein, unless otherwise indicated or otherwise apparent from the context, the phrase "molecular weight" or "Mw" refers to the number average molecular weight as measured in a conventional manner with gel permeation chromatography (GPC) and polyacrylic acid standards. GPC techniques are discussed in detail in Modem Size Exclusion Chromatography, W. W. Yau, J. J. Kirkland, D. D. Bly; Wiley-lnterscience, 1979, and in A Guide to Materials Characterization and Chemical Analysis, J. P. Sibilia; VCH, 1988, p. 81-84. Molecular weights are reported herein in units of Daltons.

Ethyleneoxy refers to —$CH_2$—$CH_2$—O—, propyleneoxy refers to —$CH_2$—$CH(CH_3)$—O— or —$CH(CH_3)$—$CH_2$—O—, and butyleneoxy refers to —$CH_2$—$CH(CH_2CH_3)$—O— or —$CH(CH_2CH_3)$—$CH_2$—O—.

As noted above, in one aspect, the invention provides a carrier material for use in animal litter, the carrier material comprising: bentonite clay; and a dust suppression agent coated on the bentonite clay.

The bentonite clay is preferably a swellable material, such as sodium bentonite. Other bentonite clays, such as calcium bentonite, may be used. In some embodiments the carrier material comprises a mixture of bentonite clay and calcium carbonate. In some embodiments, the carrier material has an average particle size ranging from 140 to 2000 microns. In some embodiments, the particle size ranges from 4 mesh to 200 mesh.

The dust suppression agent of the composition comprises one or more alkoxylate materials of formula I:

$$R\text{—}O\text{-}(AO)_z\text{—}H \qquad (I)$$

wherein R is H, aryl, or linear or branched $C_4$-$C_{24}$ alkyl; AO at each occurrence is independently ethyleneoxy, propyleneoxy, butyleneoxy, or random or block mixtures thereof; and z represents the average number of moles of AO and ranges from 1 to 80.

In some embodiments, R in the alkoxylate of formula I is linear or branched $C_4$-$C_{24}$ alkyl, alternatively linear or branched $C_4$-$C_{20}$ alkyl, alternatively linear or branched $C_6$-$C_{18}$ alkyl, alternatively linear or branched $C_6$-$C_{12}$ alkyl, or alternatively linear or branched $C_9$-$C_{15}$ alkyl.

In some embodiments, R in the formula I alkoxylate is H. preferably, when R is H, AO is a random or block, preferably block, distribution of ethyleneoxy and propyleneoxy.

When the AO unit in formula I represents more than one of ethyleneoxy, propyleneoxy, and butyleneoxy groups, the groups may be present in random or block (including combinations of random and block) configuration. In some embodiments, block configuration is preferred.

In some embodiments, AO in the alkoxylate of formula I is a random or block distribution of ethyleneoxy and propyleneoxy, alternatively it is a random or block distribution of ethyleneoxy and butyleneoxy. In some embodiments, AO is ethyleneoxy. Preferably, when AO is ethyleneoxy, R is not hydrogen, more preferably R is linear or branched $C_4$-$C_{24}$ alkyl.

In some embodiments, the alkoxylate is a mixture of two or more materials of formula I. in some embodiments, it is a mixture of materials of different R groups that are independently selected from $C_4$-$C_{20}$ alkyl.

In some embodiments of the invention, the dust suppression agent is an alkoxylate of formula II:

$$R^1\text{—O—}(PO)_x(EO)_y\text{—H} \quad (II)$$

wherein $R^1$ is linear or branched $C_4$-$C_{20}$ alkyl; PO is propyleneoxy; EO is ethyleneoxy, x is from 0.5 to 12; and y is from 2 to 20.

In some embodiments, the dust suppression agent is an alkoxylate of formula II-A, which is an alkoxylate of formula II wherein $R^1$ is a mixture of two or more linear alkyl moieties each containing one or more linear alkyl group with an even number of carbon atoms from 4 to 20; x is from 0.5 to 10; and y is from 2 to 20.

Preferably, $R^1$ in the formula II-A alkoxylates represents a mixture of linear alkyl moieties that are the alkyl portions of seed oil-derived alcohols. In some embodiments, $R^1$ has an alkyl moiety distribution as in Table A:

TABLE A

| Amount | Alkyl Moieties |
|---|---|
| 0 wt % to 40 wt % | $C_6$ |
| 20 wt %-40 wt % | $C_8$ |
| 20 wt %-45 wt % | $C_{10}$ |
| 10 wt %-45 wt % | $C_{12}$ |
| 0 wt % to 40 wt % | $C_{14}$ |
| 0 wt % to 15 wt % | $C_{16-18}$ |

As used herein, "$C_{16-18}$" means "$C_{16}$, $C_{18}$, or a mixture thereof."

Any one or more of $C_6$, $C_{14}$, and $C_{16-18}$ alkyl moieties may, but need not, be present in the composition. When present, the amounts of $C_6$, $C_{14}$, and $C_{16-18}$ alkyl moieties may satisfy any of their respective ranges as shown in Table A as long as all weight percentages total 100 wt %. In some embodiments, one or more of $C_6$, $C_{14}$, and $C_{16-18}$ alkyl moieties are present in an amount greater than zero. In some embodiments, $C_6$ and $C_{14}$ are each present in an amount greater than zero, and there is also an amount greater than zero of $C_{16-18}$.

In some embodiments, $R^1$ in the formula II-A alkoxylates has an alkyl moiety distribution as in Table B.

TABLE B

| Amount | Alkyl Moieties |
|---|---|
| 0 wt % to 36 wt % | $C_6$ |
| 22 wt %-40 wt % | $C_8$ |
| 27 wt %-44 wt % | $C_{10}$ |
| 14 wt %-35 wt % | $C_{12}$ |
| 5 wt % to 13 wt % | $C_{14}$ |
| 0 wt % to 5 wt % | $C_{16-18}$ |

The alkoxylate mixture as in Table B includes a mixture of at least four alkyl moieties: $C_8$, $C_{10}$, $C_{12}$, and $C_{14}$. Any one or more of $C_6$ and $C_{16-18}$ alkyl moieties may, but need not, be present in alkoxylate compositions of this preferred subset of the preferred alkoxylates. When present, the amounts of $C_6$, and $C_{16-18}$ alkyl moieties may satisfy any of their respective ranges as shown in Table A as long as all weight percentages total 100 wt %.

In some embodiments, the amount of $C_6$ in $R^1$ of formula II-A is zero. Independently, in some embodiments, the amount of $C_{16-18}$ in $R^1$ is not zero.

Formula II-A above includes variables "x" and "y" that, taken together, establish a degree of alkoxylation in an oligomer distribution. Individually, "x" and "y" represent degrees of, respectively, propoxylation and ethoxylation. In some embodiments, the degree of propoxylation or "x" falls within a range of from 0.5 to 7, preferably within a range of 0.5 to less than 4, more preferably within a range of from 0.5 to 3, still more preferably within a range of from 2 to 3, and even more preferably within a range of from 2.5 to 3. The degree of ethoxylation or "y" preferably falls within a range of from 2 to 10, more preferably within a range of from 2 to 8, still more preferably within a range of from 3 to 8.

In some embodiments, the sum of x and y in formula II-A is from 1 to 15. In some embodiments, the sum of x and y is from 1 to 7. In some embodiments, x is within a range of from 2.5 to 3, y is within a range of from 2 to 10, and $R^1$ has an alkyl moiety distribution as in Table B. In some embodiments, the amount of $C_6$ in $R^1$ is zero, the amount of $C_{16-18}$ in $R^1$ is not zero, and the sum of x and y is 1 to 7.

In some embodiments, the formula II-A alkoxylate is $C_{8-16}O(PO)_{2.5}(EO)_5H$ (based on raw material feeds) derived from an alcohol stream that provides an alkyl moiety weight percentage distribution as follows: $C_8$=22.5%, $C_{10}$=27.5%, $C_{12}$=35%, $C_{14}$=12.5 and $C_{16}$=2.5%.

In some embodiments, the formula II-A alkoxylate is a blend of $C_{8-10}O(PO)_{2.5}(EO)_{58}H$ (derived from an alcohol blend consisting of about 55% n-decanol and about 45% n-octanol) and $C_{12-16}O(PO)_{2.5}(EO)_8H$ (derived from an alcohol blend consisting of about 70% n-dodecanol, 25% n-tetradecanol and 5% n-hexadecanol), preferably at a ratio of the two formula II-A materials of 65:35.

In some embodiments, the formula II-A alkoxylate is a blend of 70% $C_8C_{10}$ linear alcohol from seed oil ($R^1$) and 30% $C_{12}C_{14}$ linear alcohol from seed oil ($R^1$), and x is 3 and y is 5. In some embodiments, the formula II-A alkoxylate is a blend of 70% $C_8C_{10}$ linear alcohol from seed oil ($R^1$) and 30% $C_{12}C_{14}$ linear alcohol from seed oil ($R^1$), and x is 3 and y is 7.

In some embodiments, the alkoxylate of formula II-A has a molecular weight from 400 to 800.

In some embodiments, the dust suppression agent is an alkoxylate of formula II-B, which is an alkoxylate of formula II wherein $R^1$ is linear or branched $C_6$-$C_{12}$ alkyl; x is from 2 to 11; and y is from 1 to 15.

In some embodiments, $R^1$ in formula II-B is linear or branched $C_6$-$C_{10}$ alkyl, alternatively linear or branched $C_8$-$C_{10}$ alkyl. In some embodiments, $R^1$ is linear or branched C8 alkyl. In some embodiments, $R^1$ is 2-ethylhexyl ($CH_3CH_2CH_2CH_2CH(CH_2CH_3)CH_2$—). In some embodiments, $R^1$ is 2-propylheptyl ($CH_3CH_2CH_2CH_2CH_2CH(CH_2CH_2CH_3)CH_2$—). In some embodiments, x in formula II-B is from 3 to 10, alternatively from 4 to 6. In some embodiments, y in formula II-B is from 1 to 11, alternatively from 3 to 11. In some embodiments, the formula II-B alkoxylate is $C_8$-$C_{14}O$—$(PO)_{2-5}(EO)_{5-9}$—H, where the C8-C14 group is linear or branched, preferably branched. In some embodiments, the formula II-B alkoxylate is a material or mixture of mixtures with the following average formulas: $2EH(PO)_2(EO)_4$—H, $2EH(PO)_3(EO)_{6.8}$—H, $2EH(PO)_{5.5}(EO)_8$—H, $2EH(PO)_9(EO)_9$—H, $2EH(PO)_{11}(EO)_{11}$—H, $2EH(PO)_5(EO)_3$—H, or $2EH(PO)_5(EO)_6$—H (2EH=2-ethylhexyl). In some embodiments, the molecular weight of the Formula II-B alkoxylate ranges from 500 to 1000 Daltons.

In some embodiments, the dust suppression agent is an alkoxylate of formula III:

$$R^2\text{—O-}(EO)_m(BO)_n\text{—H} \quad (III)$$

wherein $R^2$ is linear or branched $C_{9-15}$ alkyl; EO is ethyleneoxy; BO is butyleneoxy; m is from 5 to 15, and n is from 1 to 4. In some embodiments, $R^2$ is linear or branched $C_{12}$-$C_{14}$ alkyl, preferably it is $C_{12}$ alkyl. In some embodiments, m is from 8 to 12, preferably 10. In some embodiments, n is 1-3, preferably 2. In some embodiments, $R^2$ is linear or branched $C_{12}$-$C_{14}$ alkyl, m is 10, and n is 2. In some embodiments, $R^2$ is linear $C_{12}$-$C_{14}$ alkyl, m is 10, and n is 2.

In some embodiments, the alkoxylate of formula II has a molecular weight from 600 to 1000 Daltons.

In some embodiments, the dust suppression agent is an alkoxylate of formula IV:

$$\text{HO-(EO)}_r\text{(PO)}_s\text{(EO)}_t\text{—H} \qquad \text{(IV)}$$

wherein EO is ethyleneoxy; PO is propyleneoxy; r is from 2 to 10; s is from 20 to 70; and t is from 2 to 10. In some embodiments, r is 2 to 8, preferably r is 2-3 or it is 8. In some embodiments, s is 30 to 60, preferably 30 or 60. In some embodiments, t is 2 to 8, preferably t is 2-3 or it is 8. In some embodiments, r is 2-3, s is 30, and t is 2-3. In some embodiments, r is 8, s is 60, and t is 8. In some embodiments, the molecule has a weight average molecular weight of 1500 to 5000 Daltons.

In some embodiments, the dust suppression agent is an alkoxylate of formula V:

$$R^3\text{—O-(EO)}_y\text{—H} \qquad \text{(V)}$$

wherein $R^3$ is linear or branched $C_{6-18}$ alkyl; EO is ethyleneoxy; and y 3 to 20. In some embodiments, $R^3$ is linear or branched C12-C14 alkyl. In some embodiments, $R^3$ is a linear secondary C12-C14 alkyl. In some embodiments, y 5 to 10, preferably it is 7. In some embodiments, $R^3$ is linear C12-C15 alkyl, and the molecule has a molecular weight of about 515.

In some embodiments, the formula V alkoxylate has a molecular weight of 400 to 1000 Daltons.

Alkoxylates of formula I are commercially available or they may be prepared using known synthetic procedures. A typical preparation may involve reaction of an alcohol compound with ethylene oxide, propylene oxide, and/or butylene oxide, in the present of a catalyst (e.g., KOH, NaOH, BF3, or DMC (double metal cyanide) such as zinc cobalt cyanide ($Zn_3[Co(CN)_6]_2$). The ethylene oxide, propylene oxide, and/or butylene oxide may be reacted with the alcohol simultaneously if random polymers are desired, or may be reacted sequentially in the case of block polymers. Combinations of block and random polymers may also be prepared.

By way of more specific example, formula II-A alkoxylates are preferably prepared in a sequential manner that includes propoxylation (adding PO or poly(oxypropylene)) moieties to an alcohol or mixture of alcohols to form a PO block followed by ethoxylation (adding EO or poly(oxyethylene)) moieties to form an EO block attached to the PO block, but spaced apart from $R^1$ which represents alkyl moieties from the alcohol or mixture of alcohols. One may either begin with a mixture of alcohols that provides a distribution of alkyl moieties and then sequentially propoxylate and ethoxylate the mixture or separately propoxylate and ethoxylate select alcohols and then combine such alkoxylates (propoxylated and ethoxylated alcohols) in proportions sufficient to provide a distribution, for example, as shown in Table A above.

The dust suppression agent may be coated on the bentonite clay using techniques well known to those skilled in the art. By way of non-limiting example, the dust suppression agent may be dissolved or dispersed in a solvent (e.g., water). The dispersion may then be blended with the bentonite clay in a mixer with mechanical agitation. Or the dispersion may be sprayed onto the bentonite clay, e.g., in a moving bed or falling stream of the bentonite clay particles. In some embodiments, the dust suppression agent is free of polymer binders.

There is no particular limitation on how much dust suppression agent should be applied to the bentonite clay. In some embodiments, it may be preferred that the amount of dust suppression agent ranges from 0.1 to 5 percent by weight, based on the total dry weight of the bentonite clay and the dust suppression agent.

The animal litter of the invention may contain other additives typically found in such materials. These include, but are not limited to, one or more of: clumping agents (e.g., polyethylene glycol or carboxymethyl cellulose), limestone (calcium carbonate), fillers, humectants, disintegrants, odor absorbing materials (e.g., sodium carbonate, potassium carbonate, siliceous material, opaline silica, activated carbon, sodium bisulfate complex, or corn starch), zeolite, dedusting agents (e.g., gaur gum, PTFE coated clay, or fluoropolymers), antimicrobials such as bronopol and silver based compounds, fragrances, other chelants (diethylenetriaminepentaacetic acid (DTPA) for example), gypsum, small molecule organic acids, polymers with neutralization capacity or acid groups (e.g., cellulose acetate, polycarboxylates), rice flour, quaternary amines, probiotic bacteria and/or ammonia oxidizing bacteria.

Examples of animals with which the animal litter of the invention may be used include, without limitation, domesticated animals, zoo animals, farm animals, pets, and other animals that spend some of their time in a partially or fully enclosed environment. More specific examples include, without limitation, cats, dogs, poultry (e.g., chickens), horses, cows, swine, rabbits, goats, and guinea pigs. Cats are preferred (therefore a preferred animal litter is cat litter).

Some embodiments of the invention will now be described in detail in the following Examples.

Examples

Dust suppression agents tested in the examples are as follows:
- Agent 1: an alkoxylate of formula II-B where $R^1$ is 2-ethylhexyl, x is 5, and y is 3.
- Agent 2: an alkoxylate of formula II-B where $R^1$ is 2-ethylhexyl, x is 5, and y is 6.
- Agent 3: an alkoxylate of formula II-B where $R^1$ is 2-ethylhexyl, x is 5, and y is 9.
- Agent 4: an alkoxylate of formula IV where r is 2 to 3, s is 30, and t is 2-3.
- Agent 5: an alkoxylate of formula IV where r is 8, s is 60, and t is 8.
- Agent 6: an alkoxylate that is a mixture of materials of formula II-A containing 70% $C_8C_{10}$ linear alcohol from seed oil ($R^1$) and 30% $C_{12}C_{14}$ linear alcohol from seed oil ($R^1$), and where x is 3 and y is 7.
- Agent 7: an alkoxylate that is a mixture of materials of formula II-A containing 70% $C_8C_{10}$ linear alcohol from seed oil ($R^1$) and 30% $C_{12}C_{14}$ linear alcohol from seed oil ($R^1$), and where x is 3 and y is 3.
- Agent 8: an alkoxylate of formula III where $R^2$ is linear $C_{12}$-$C_{14}$ alkyl, m is 10, and n is 2.
- Agent 9: an alkoxylate of formula V where $R^3$ is a linear secondary $C_{12}$-$C_{14}$ alkyl, and y is 7.
- Agent 10: an alkoxylate of formula V where $R^3$ is linear C12-C15 alkyl, and the molecule has a molecular weight of about 515.

In addition, various samples contain the following clumping agents:

PEG 8K: polyethylene glycol with molecular weight of about 8,000 Daltons.

CMC 10K: carboxymethyl cellulose with molecular weight of about 650,000 Daltons.

To demonstrate the invention, turbidity readings and settled dust particles readings are used. The approach with the turbidity reading is to analyze the particle suppression provided by the compositions of the invention to determine the suspension of particles in water extractions from coated and uncoated animal litter by measuring the turbidity of the water extractions. Turbidity is measured by an instrument called a nephelometer.

The units of turbidity from a nephelometer are Nephelometric Turbidity Units (NTU). High NTU values indicate higher turbidity and lower NTU values indicate lower turbidity. Turbidity in the water extractions of the coated and uncoated animal litter is due to particles suspended in the water. Low NTU values of the coated animal litter indicate that fewer particles are extracted from the coated animal litter demonstrating particle dust suppression. The uncoated animal litter has the highest NTU value indicating more particles being extracted from the animal litter.

In these examples, we coated sodium bentonite and limestone both separately and as a 50/50 blend leaving a 1% hole in the formulation. We sprayed the dust suppressant agent as 0.9% active and left 0.1% for the clumping agent. We used polyethylene glycol and carboxymethyl cellulose as our clumping agents. For the first set of data points we used just sodium bentonite. We used an open aluminum pan to put the sodium bentonite into. Then added 0.1% of the clumping agent (added the clumping agent first before spraying) and sprayed 0.9% active of the dust suppressant agent on top of the animal litter using a spraying apparatus. Thus spreading the dust suppressant agent as evenly as possible over the animal litter to make as uniform as possible. Then immediately mixed by pouring the animal litter in to an appropriate sized jar and mixed by shaking and rolling the jar for 2 minutes. Then the animal litter was poured back into the aluminum pan to dry. The animal litter was allowed to dry at ambient temperature.

After drying, 3 grams of the animal litter is placed into a 1 ounce vial. Then 25 milliliters of deionized water is placed into the 1 ounce vial on top of the 3 grams of the animal litter Immediately invert the vial 15 times quickly to mix the deionized water and animal litter Immediately after the 15th inversion, remove the top 11 milliliters and placed into another 1 ounce vial. Immediately read the 1 ounce vial in turbidimeter.

We used AF Scientific Micro 100 Turbidimeter to take our turbidity reading. Turbidity reading at times 1 hour and 24 hours are presented in the Tables below. We also measure the height of the deposition in the 1 ounce vial at 24 hours. The lower turbidity reading indicates that there are less particles floating in the deionized water and taking the top 11 milliliters allows us to take only the smallest particles (typically causes the dusting phenomena). The deposition in the 1 ounce vial allows us to get a quantity of the smaller particles while also taking into consideration the solubility of the dust suppression agent in the presence of the deionized water. This is repeated with the limestone and with the 50/50 blend of sodium bentonite and limestone.

The Tables below show that dust suppression agents of the invention reduced the turbidity and the settled particles. Agent 1, Agent 6, and Agent 7 performed the best. The results show that the majority of the smaller particles originate from the sodium bentonite and to mitigate the dusting issue is to mitigate the dusting from the sodium bentonite (seen in the deposition of the particles after 24 hours).

TABLE 1

50/50 Blend of Sodium Bentonite and Limestone

| | No Clumping Agent | | PEG 8K | | CMC 10K | |
| --- | --- | --- | --- | --- | --- | --- |
| | NTU Time 1 hour | NTU Time 24 hours | NTU Time 1 hour | NTU Time 24 hours | NTU Time 1 hour | NTU Time 24 hours |
| No Dust suppression agent | 395.0 | 54.3 | 390.0 | 53.4 | 399.0 | 74.2 |
| Agent 1 | 305.5 | 24.9 | 299.0 | 15.0 | 241.0 | 31.5 |
| Agent 2 | 760.0 | 74.1 | 540.0 | 32.7 | 272.0 | 60.9 |
| Agent 3 | 486.0 | 77.1 | 526.0 | 92.5 | 262.0 | 73.5 |
| Agent 4 | 203.0 | 44.3 | 200.0 | 30.8 | 202.0 | 38.0 |
| Agent 5 | 986.0 | 68.6 | 1037.0 | 25.3 | 1100.0 | 169.0 |
| Agent 6 | 268.0 | 26.5 | 250.0 | 10.8 | 376.0 | 22.0 |
| Agent 7 | 415.0 | 16.5 | 404.0 | 25.8 | 253.0 | 23.8 |
| Agent 8 | 454.0 | 30.2 | 430.0 | 25.3 | 450.0 | 25.5 |
| Agent 9 | 657.0 | 39.0 | 608.0 | 30.0 | 621.0 | 35.0 |
| Agent 10 | 1070.0 | 128.0 | 1100.0 | 125.0 | 995.0 | 120.0 |

TABLE 2

Sodium Bentonite Cat Litter Formulations

| | No Clumping Agent | | PEG 8K | | CMC 10K | |
| --- | --- | --- | --- | --- | --- | --- |
| | NTU Time 1 hour | NTU Time 24 hours | NTU Time 1 hour | NTU Time 24 hours | NTU Time 1 hour | NTU Time 24 hours |
| No Dust suppression agent | 335.0 | 33.9 | 395.0 | 54.3 | 390.0 | 53.4 |

TABLE 2-continued

Sodium Bentonite Cat Litter Formulations

| | No Clumping Agent | | PEG 8K | | CMC 10K | |
|---|---|---|---|---|---|---|
| | NTU Time 1 hour | NTU Time 24 hours | NTU Time 1 hour | NTU Time 24 hours | NTU Time 1 hour | NTU Time 24 hours |
| Agent 1 | 1.3 | 0.45 | 42.7 | 1.2 | 39.8 | 1.1 |
| Agent 2 | 1.1 | 0.4 | 39.8 | 1.0 | 35.5 | 1.1 |
| Agent 3 | 1.9 | 0.35 | 58.7 | 1.8 | 55.3 | 1.5 |
| Agent 4 | 6.4 | 0.2 | 185.0 | 7.8 | 165.0 | 5.8 |
| Agent 5 | 27.4 | 0.2 | 325.0 | 25.8 | 302.0 | 23.5 |
| Agent 6 | 2.1 | 0.1 | 125.0 | 1.9 | 121.0 | 2.5 |
| Agent 7 | 3.4 | 0.1 | 115.0 | 3.0 | 111.0 | 3.3 |
| Agent 8 | 10.9 | 0.5 | 75.0 | 10.2 | 71.0 | 9.9 |
| Agent 9 | 5.0 | 0.5 | 32.0 | 4.5 | 31.5 | 5.3 |
| Agent 10 | 7.9 | 0.5 | 42.3 | 7.1 | 40.3 | 7.5 |

TABLE 3

Limestone Cat Litter Formulations (comparative example)

| | No Clumping Agent | | PEG 8K | | CMC 10K | |
|---|---|---|---|---|---|---|
| | NTU Time 1 hour | NTU Time 24 hours | NTU Time 1 hour | NTU Time 24 hours | NTU Time 1 hour | NTU Time 24 hours |
| No Dust suppression agent | 400.0 | 14.4 | 392.5 | 53.9 | 395.0 | 71.2 |
| Agent 1 | 21.6 | 0.2 | 465.0 | 20.5 | 460.0 | 23.5 |
| Agent 2 | 21.5 | 0.1 | 1100.0 | 22.5 | 1100.0 | 20.3 |
| Agent 3 | 7.0 | 0.1 | 1100.0 | 7.0 | 1100.0 | 7.0 |
| Agent 4 | 11.1 | 0.1 | 305.0 | 11.1 | 305.0 | 11.1 |
| Agent 5 | 118.0 | 0.1 | 605.0 | 118.0 | 605.0 | 118.0 |
| Agent 6 | 580.0 | 0.2 | 921.0 | 580.0 | 921.0 | 580.0 |
| Agent 7 | 93.0 | 0.1 | 350.0 | 91.5 | 350.0 | 89.5 |
| Agent 8 | 16.0 | 0.2 | 162.0 | 16.0 | 162.0 | 16.0 |
| Agent 9 | 12.4 | 0.15 | 152.0 | 12.4 | 152.0 | 12.4 |
| Agent 10 | 16.1 | 0.15 | 121.0 | 16.1 | 121.0 | 16.1 |

TABLE 4

Settled Particles

| | No Clumping Agent | | | PEG 8K | | | CMC 10K | | |
|---|---|---|---|---|---|---|---|---|---|
| | 50/50 Blend Sodium Bentonite/ Limestone | Sodium Bentonite | Limestone (comparative) | 50/50 Blend Sodium Bentonite/ Limestone | Sodium Bentonite | Limestone (comparative) | 50/50 Blend Sodium Bentonite/ Limestone | Sodium Bentonite | Limestone (comparative) |
| No Dust suppression agent | 0.6 | 0.7 | 0.7 | 0.6 | 0.7 | 0.7 | 0.6 | 0.7 | 0.7 |
| Agent 1 | 0.2 | 0.45 | 0.45 | 0.2 | 0.45 | 0.45 | 0.25 | 0.45 | 0.45 |
| Agent 2 | 0.25 | 0.4 | 0.4 | 0.2 | 0.4 | 0.4 | 0.2 | 0.4 | 0.4 |
| Agent 3 | 0.2 | 0.35 | 0.35 | 0.2 | 0.35 | 0.35 | 0.2 | 0.35 | 0.35 |
| Agent 4 | 0.2 | 0.2 | 0.2 | 0.2 | 0.2 | 0.2 | 0.2 | 0.2 | 0.2 |
| Agent 5 | 0.2 | 0.2 | 0.2 | 0.25 | 0.2 | 0.2 | 0.25 | 0.2 | 0.2 |
| Agent 6 | 0.15 | 0.1 | 0.1 | 0.15 | 0.1 | 0.1 | 0.15 | 0.1 | 0.1 |
| Agent 7 | 0.15 | 0.1 | 0.1 | 0.15 | 0.1 | 0.1 | 0.15 | 0.1 | 0.1 |
| Agent 8 | 0.4 | 0.5 | 0.5 | 0.4 | 0.5 | 0.5 | 0.4 | 0.5 | 0.5 |
| Agent 9 | 0.3 | 0.5 | 0.5 | 0.3 | 0.5 | 0.5 | 0.3 | 0.5 | 0.5 |
| Agent 10 | 0.4 | 0.5 | 0.5 | 0.4 | 0.5 | 0.5 | 0.4 | 0.5 | 0.5 |

What is claimed is:

1. A carrier material for use in animal litter, the carrier material comprising:
   bentonite clay;
   calcium carbonate; and
   a dust suppression agent coated on the bentonite clay and the calcium carbonate, wherein the dust suppression agent is an alkoxylate of formula II:

$$R^1\text{—O—}(PO)_x(EO)_y\text{—H} \qquad (II)$$

wherein $R^1$ is linear or branched $C_6$-$C_{12}$ alkyl; PO is propyleneoxy; EO is ethyleneoxy; x is from 2 to 11; and y is from 1 to 15.

2. The carrier material of claim 1, wherein the dust suppression agent is free of polymer binder.

3. An animal litter composition comprising the carrier material of claim 1 and optionally one or more of: a clumping agent, an odor absorbing material, an antimicrobial compound, or a fragrance.

4. The carrier material of claim 1, wherein the carrier material has an average particle size ranging from 140 to 2,000 microns.

5. The carrier material of claim 1, further comprising other additives selected from the group consisting of clumping agents, fillers, humectants, disintegrants, odor absorbing materials, zeolite, dedusting agents, antimicrobials, fragrances, chelants, gypsum, small molecule organic acids, polymers with neutralization capacity or acid groups, rice flour, quaternary amines, probiotic bacteria, ammonia oxidizing bacteria and mixtures thereof.

6. The carrier material of claim 1, wherein the carrier material contains a 50/50 wt % blend of sodium bentonite and calcium carbonate.

7. The carrier material of claim 6, wherein the dust suppression agent is a mixture of 70 wt % material of formula II, wherein $R^1$ is a $C_{8-10}$ linear alcohol from seed oil and 30 wt % material of formula II, wherein $R^1$ is a $C_{12-14}$ linear alcohol from seed oil.

8. The carrier material of claim 7, wherein x is 3 and y is 3.

* * * * *